United States Patent [19]
Leppard

[11] 3,981,698
[45] Sept. 21, 1976

[54] PROCESS FOR THE REMOVAL OF CARBON DIOXIDE FROM GASES

[75] Inventor: Colin James Leppard, Emsworth, England

[73] Assignee: CJB Development Limited, London, England

[22] Filed: Feb. 18, 1975

[21] Appl. No.: 550,777

Related U.S. Application Data

[63] Continuation-in-part of Ser. No. 388,352, Aug. 15, 1973, Pat. No. 3,893,827.

[30] Foreign Application Priority Data

Feb. 22, 1974 United Kingdom............... 8192/74

[52] U.S. Cl................................... 55/31; 55/33; 55/68; 55/75
[51] Int. Cl.²............................. B01D 53/04
[58] Field of Search.................. 55/30–32, 55/35, 62, 68, 75, 76, 179, 180, 233, 25, 58

[56] References Cited
UNITED STATES PATENTS

| | | | |
|---|---|---|---|
| 3,221,476 | 12/1965 | Meyer | 55/179 |
| 3,237,379 | 3/1966 | Kant et al. | 55/58 |
| 3,242,645 | 3/1966 | Montgareuil et al. | 55/58 |
| 3,242,651 | 3/1966 | Arnoldi | 55/68 X |
| 3,659,400 | 5/1972 | Kester | 55/58 |

*Primary Examiner*—John Adee
*Attorney, Agent, or Firm*—Bacon & Thomas

[57] ABSTRACT

A process for the removal of carbon dioxide from a wet gas stream comprises passing the gas stream through an integrated absorption bed which comprises a first portion which is an absorbent for water whereby water is removed from the gas stream, a second portion which is an absorbent for carbon dioxide whereby carbon dioxide is removed from the gas stream and a third portion which is an absorbent for water which is saturated with water whereby water is reintroduced into the gas stream. The process may be operated continuously by employing two integrated absorption beds, one of which is absorbing carbon dioxide while the other is desorbing carbon dioxide. The process may be used for the treatment of air from an enclosed atmosphere such as an apple store.

9 Claims, 6 Drawing Figures

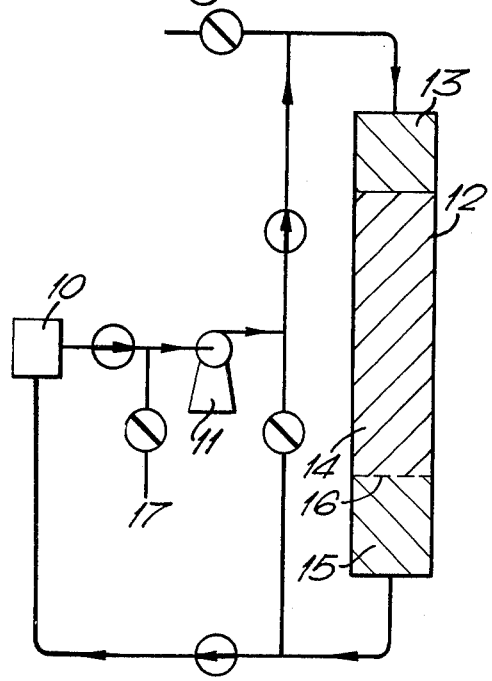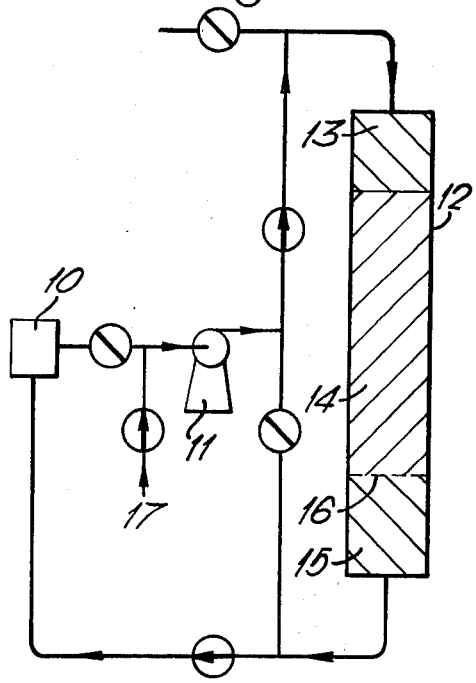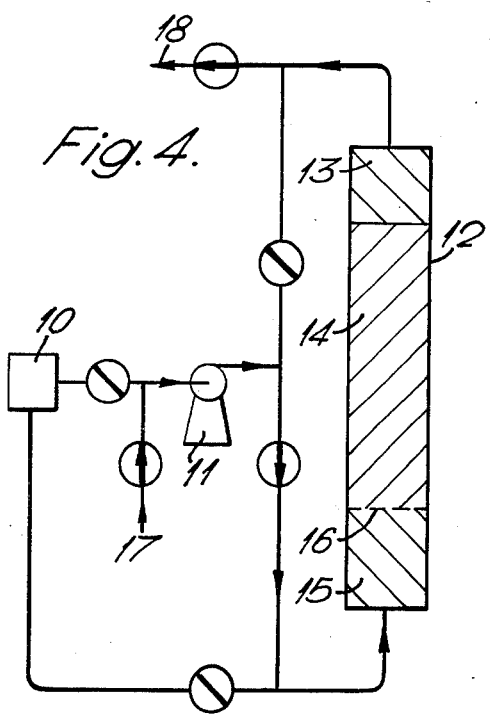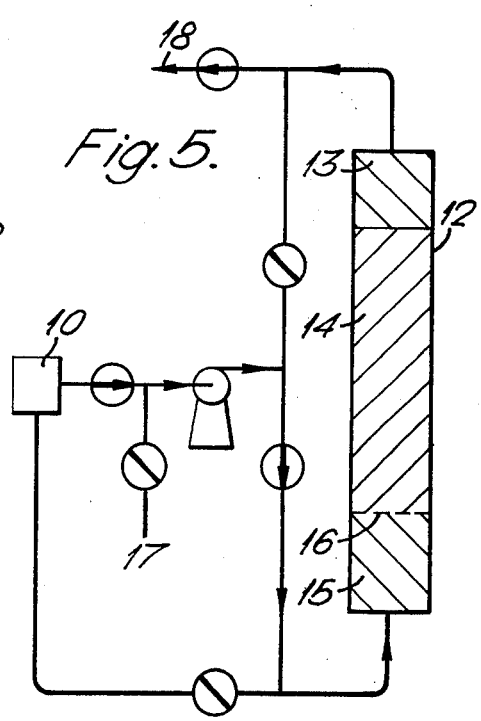

3,981,698

PROCESS FOR THE REMOVAL OF CARBON DIOXIDE FROM GASES

CROSS-REFERENCE TO RELATED APPLICATION

This application is a continuation-in-part application of my copending U.S. Pat. application Ser. No. 388,352 now U.S. Pat. No. 3,893,827.

BACKGROUND OF THE INVENTION

The present invention relates to a process for the removal of carbon dioxide from gases, particularly from enclosed atmospheres.

The controlled atmosphere storage of fruit, such as apples and pears requires the removal of carbon dioxide from gas-tight, refrigerated stores in order to prolong significantly the storage period and, in a particular aspect therefore the present invention relates to a process for the removal of carbon dioxide from a controlled atmosphere fruit store.

My copending U.S. Pat. application Ser. No. 388,352 relates to a process for the selective removal of constituents from fluids, and, in a particular aspect describes a process for the removal of a contaminant from a gas or mixture of gases, which additionally contains another constituent which process comprises (i) subjecting the gas stream containing the contaminant and said other constituent to a first treatment with a reversible absorbent for said other constituent to remove said other constituent from the gas stream, (ii) removing the contaminant from the gas stream in the absence of said other constituent and (iii) subjecting the gas stream to a second treatment with a reversible absorbent for said other constituent which absorbent has previously absorbed a quantity of said other constituent, under conditions whereby said second constituent is desorbed from the absorbent and is reintroduced into the gas so as to produce a gas containing said constituent in the absence of the contaminant.

The said application specifically describes a process for the removal of carbon dioxide from a wet air stream in which the air stream is dried by passage through a bed of an absorbent material to selectively absorb water, the dried air stream is then passed through a separate bed of an absorbent material to absorb carbon dioxide and the clean air stream then passes through a further separate bed of absorbent material, which has absorbed water during the preceding cycle, when water is desorbed from the bed by the dry air.

I have now found that this process may advantageously be operated employing an integral absorption bed.

SUMMARY OF THE INVENTION

Accordingly the present invention provides a process for the removal of carbon dioxide from a wet gas stream which process comprises passing the gas stream through an integrated absorption bed which comprises a first portion which is an absorbent for water whereby water is removed from the gas stream, a second portion which is an absorbent for carbon dioxide whereby carbon dioxide is removed from the gas stream and a third portion which is an absorbent for water which is saturated with water whereby water is reintroduced into the gas stream.

BRIEF DESCRIPTION OF THE DRAWINGS

FIGS. 2 to 5 are schematic diagrams which illustrate schematically the layout and valve sequence for absorption, changeover, desorption and changeover, respectively, of a particular plant for removing carbon dioxide from the enclosed atmosphere of an apple store.

DESCRIPTION OF THE PREFERRED EMBODIMENTS

Figure 1A:
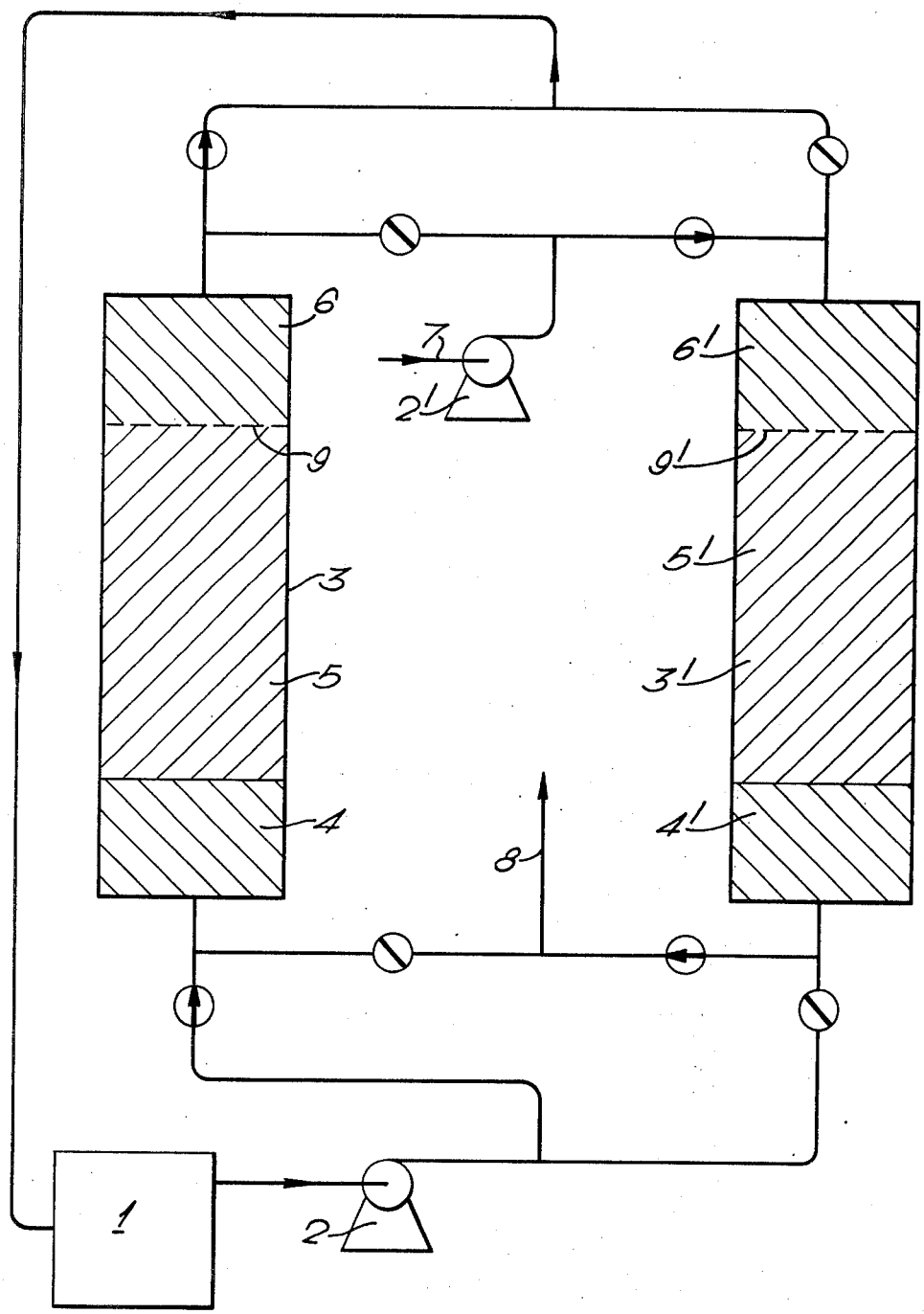
FIGS. 1a and 1b are schematic diagrams which illustrate, respectively, the two halves of a cyclic mode of removing carbon dioxide from the enclosed atmosphere of an apple store.

Throughout the present specification the terms "absorb" and "absorbent" will be used, but it is to be understood that these terms are intended to include within their meaning the terms "adsorb" and "adsorbent" where, in the context, these latter terms would be more appropriate.

The absorbent for water may be, for example, silica gel, 3A molecular sieve material, activated alumina or any other suitable desiccant. The absorbent for carbon dioxide may be, for example, 5A, 10A or 13X molecular sieve material, activated carbon, activated charcoal or any other suitable absorbent. A mixture of absorbent materials may also be used. Whilst it is preferred that the first and third portions of the integrated absorption bed contain the same absorbent material for water, the absorbent in the first portion being in absorbing condition whilst that in the third portion is in desorbing condition, this is not an essential feature of the invention.

Preferably, the gas stream which is treated in accordance with the process of the invention is from an enclosed atmosphere such as an enclosed air atmosphere. In such case gas is extracted from the enclosed atmosphere by means of a compressor or the like; passed through the integrated absorption bed to remove carbon dioxide therefrom and then back into the enclosed atmosphere.

If it is desired, the process of the present invention may be operated continuously and, in order that this may be achieved, it is necessary to provide a second integrated absorption bed which is switched into contact with the gas stream when the first integrated absorption bed is spent. The first integrated absorption bed is then regenerated ready for re-use when the second integrated absorption bed is spent. When the gas stream which is being treated is from an enclosed atmosphere the spent absorption bed is regenerated using outside air.

In order to provide the driving force required to operate the process of the invention, an excess of energy must be added to the system. This may be effected by absorbing the water and carbon dioxide respectively at a pressure which is higher than the pressure at which these constituents are desorbed. For example, a pressure differential of about 5 psi may be utilized. This may be achieved by incorporating a pressure plate between the second portion and third portion of the integrated bed.

The process of the present invention overcomes the problem of the preferential absorption of water vapour, which is associated with the use of many absorbents. Furthermore, the process of the present invention does not reduce the humidity of the gas stream which is treated below the prevailing atmospheric humidity.

This latter factor is particularly important in relation to the storage of apples, since any reduction in the humidity of the air in the apple store would tend to desiccate the apples, thereby reducing their weight and causing unsightly shrivelling of their skins.

The present invention also provides apparatus for use in the process of the invention which comprises an integrated absorption bed which comprises a first portion which is an absorbent for water, a second portion which is an absorbent for carbon dioxide and a third portion which is an absorbent for water which is saturated with water, an inlet for the introduction of a gas stream into the first portion of the bed, means for maintaining the pressure of the first portion of the absorption bed at a higher pressure than the third portion of the bed and an outlet for the removal of the gas stream from the third portion of the bed.

The present invention will be further described by way of specific example which illustrates a particular mode of carrying out the process of the invention for the removal of carbon dioxide from the enclosed atmosphere of an apple store. Flow sheet diagrams are shown in FIGS. 1a and 1b of the accompanying drawings.

Referring to FIG. 1a, air from the apple store 1 is compressed by compressor 2 to about 10 psig and passed through an integrated absorbing bed 3 which is packed in a polyvinylchloride pipe 44 inches long and 7.7 inches in internal diameter. Water is removed from the air stream by the passage of the air through the silica gel portion of the bed 4, carbon dioxide is then removed from the dry air stream by the passage of the air stream through a molecular sieve portion of the bed 5 and the air stream is then passed through the silica gel portion of the bed 6 where water is desorbed. The air stream is then returned to the store 1. At the same time as the integrated bed 3 is absorbing carbon dioxide from the air from the apple store, a second integrated bed 3' is undergoing regeneration. Air from the atmosphere outside the apple store is passed via pipe 7 to the compressor 2' and passed to the integrated bed 3'. Water is removed from the air stream by the passage of the air through the silica gel portion of the bed 6', carbon dioxide is desorbed into the air stream by the passage of the air stream through the molecular sieve portion of the bed 5' and the air stream is then passed through the silica gel portion of the bed 4' where water is desorbed. The air is then vented to the atmosphere via pipe 8. The pressure difference required to maintain the process in equilibrium is provided by pressure plate restrictions 9 and 9' positioned in each integrated bed. The pressure plates 9 and 9' are polyvinylchloride plates ½ inch in thickness which are secured in the pipe. The pressure plates have 18 holes of 1/16 inch in diameter formed therein. The faces of both pressure plates are covered with a gauze mesh in order to prevent the particles of the absorbent materials blocking the holes.

Figure 1B:
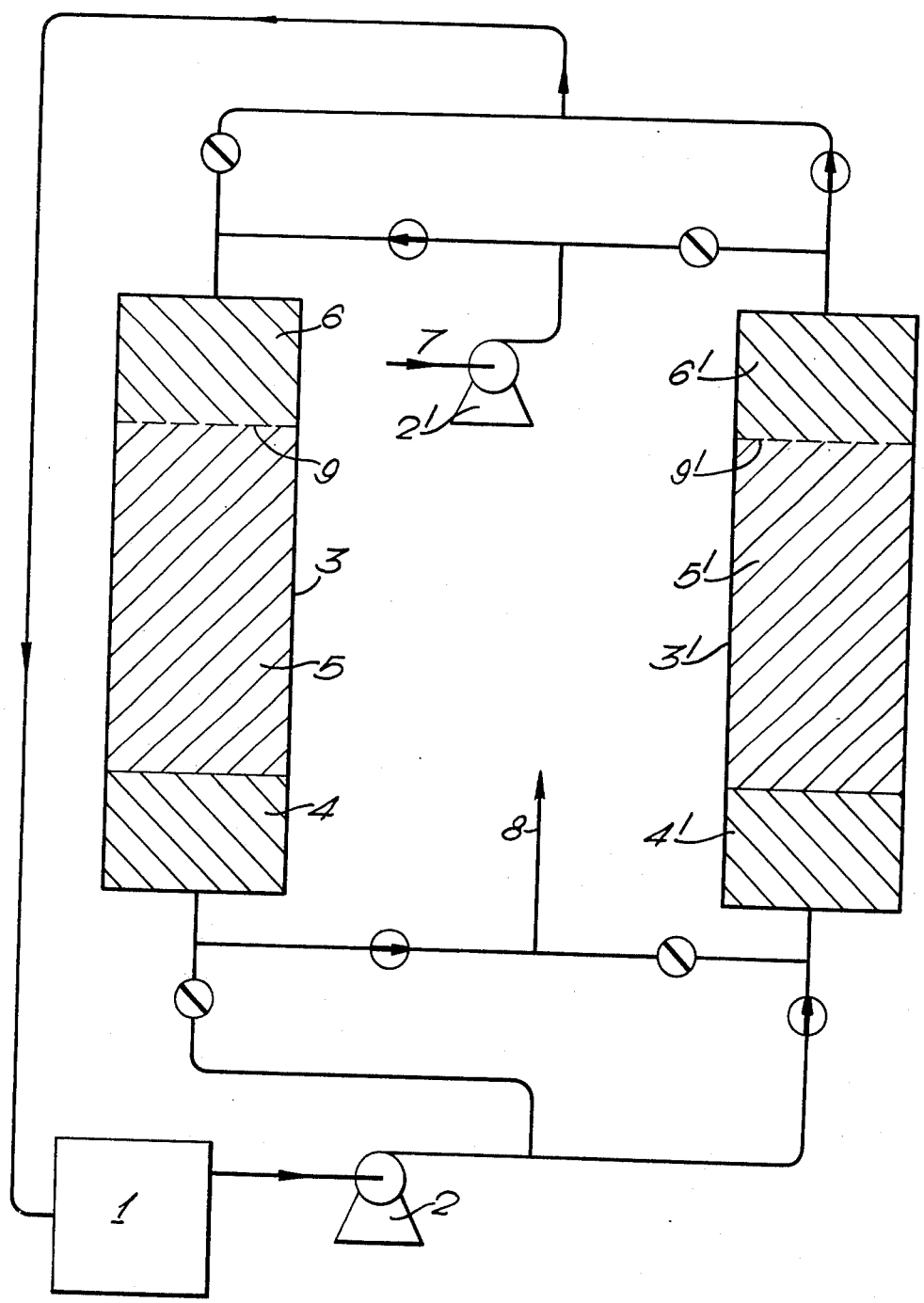

Referring to FIG. 1b, the mode of operation of the two beds 3 and 3' is reversed. Thus, bed 3' acts as the integrated absorbing bed for the removal of carbon dioxide from the air stream from the store 1 whilst the bed 3 undergoes regeneration by the passage therethrough of air from the atmosphere outside the store.

The present invention will be further described by way of another specific example which illustrates another particular mode of carrying out the process of the invention for the removal of carbon dioxide from the enclosed atmosphere of an apple store. Flow sheet diagrams are shown in FIGS. 2 to 5 of the accompanying drawings which illustrate schematically the layout and the valve sequence for absorption, desorption and changeover of a particular plant.

With reference to FIGS. 2 to 5, the plant comprises an integrated absorption bed 12 which is packed in a polyvinylchloride pipe 44 inches long and 7.7 inches in internal diameter. The integrated absorbing bed has a silica gel portion 13, a molecular sieve material portion 14 and a silica gel portion 15. A pressure plate 16 is located after the molecular sieve portion of the bed 14 and before the silica gel portion of the bed 15, in order to maintain the up-stream silica gel bed at a higher pressure (e.g. approximately 5 psi higher) than that of the down-stream silica gel bed. This provides the driving force required for the appropriate absorption and desorption processes. The pressure plate 16 is of the same design as the pressure plates 9 and 9' described with reference to FIGS. 1a and 1b.

FIG. 2 illustrates schematically the plant absorbing carbon dioxide from the enclosed atmosphere of the apple store 10. The air from the apple store 10 is extracted by a compressor 11, passed through the integrated absorption bed 12 and back into the apple store 10. The wet, carbon dioxide enriched gas from the enclosed atmosphere comes into contact with the silica gel portion 13 of the bed. Absorption of water takes place producing dry gas. The dry gas then proceeds through the molecular sieve portion 14 of the bed where carbon dioxide is absorbed. After the removal of carbon dioxide, the dry gas passes through the pressure plate 16 into the portion 15 of the bed which contains saturated silica gel. Desorption of water from the silica gel takes place producing wet gas. This gas, free of carbon dioxide, then passes back to the apple store 10.

When the absorption bed 13 has reached its absorbing capacity, the plant changes over from absorption to regeneration, as is illustrated schematically in FIG. 3.

During this changeover, the plant is in a transient state for a very short time to allow the volume of gas contained in the integrated absorption bed 12, to be flushed into the apple store 10 by fresh air which enters the plant via pipe 17. As soon as the gas in the absorption bed has been flushed out, the plant switches to complete regeneration, as is illustrated schematically in FIG. 4.

During this regeneration fresh air enters the plant via pipe 17 and is passed via the compressor 11 the integrated absorption bed 12 in the reverse direction to that of the gas stream during absorption, and back to the outside atmosphere via pipe 18.

As wet air passes through the integrated absorption bed 12, water in the air is absorbed by the silica gel portion of the bed 15 which was previously used to supply moisture to the gas from the apple store. The dry air then passes through the pressure plate 16 and into the molecular sieve portion 14 of the bed where it desorbs carbon dioxide from the molecular sieve material. The dry air proceeds through the silica gel portion 13 of the bed which was previously used to dry the incoming gas from the enclosed atmosphere. Desorption of water from the portion 13 of the bed takes place producing wet air enriched with carbon dioxide, which is vented to the outside via pipe 18.

After regeneration is complete, the plant changes over again to a transient state for a short time to allow the volume of fresh air contained in the integrated absorption bed 12 to be flushed to the outside via pipe 18 by the incoming gas from the apple store 10, as is illustrated schematically in FIG. 5. As soon as the air in the integrated absorption bed 12 has been flushed out the absorption part of the next cycle begins.

The transient state during the changeover from absorption to desorption prevents the loss of gas from the apple store, to the outside, whilst the second transient state during the changeover from desorption to absorption prevents the transference of air from the outside into the apple store.

The following Examples are intended to further illustrate, but not to limit the scope of the present invention.

EXAMPLE 1

A unit was tested in an apple store containing 30 tons of apples, mainly Cox's Orange Pippin. The following results were obtained:

| | |
|---|---|
| Store temperature | 3.4 to 3.7°C |
| Store $CO_2$ level | 0.95 to 1.15% |
| Store Humidity | Approx. 90% Relative Humidity |
| Unit Flowrate | 570 cu. ft./hr. |
| Pressure plate - 7.7 inches diameter | 12 × 1/16'' holes |
| Adsorption pressure | 8.1 psi |
| Desorption pressure | 2.4 psi |
| $H_2O$ removal beds | 2 × 7 kg of Silica Gel |
| $CO_2$ removal bed | 7 kg of 5A molecular sieve |
| Cycle time | 10 minutes |
| Purge time | 6 seconds |
| $CO_2$ removal rate | 8.4 lbs/day |

EXAMPLE 2

The following results have been obtained for the reduction of the carbon dioxide concentration of air from the atmosphere using a modified unit of the type described above:

| | |
|---|---|
| Inlet Temperature | 18°C |
| Inlet $CO_2$ level | 1.2% |
| Inlet Humidity | 67% Relative Humidity |
| Unit Flowrate | 450 l/min (15.5 cu.ft./min) |
| Pressure plate - 7.7 inches diameter | 18 × 1/16'' holes |
| Adsorption pressure | 8.2 psi |
| Desorption pressure | 3 psi |
| $H_2O$ removal beds | 2 × 7 kg of Silica Gel |
| $CO_2$ removal bed | 7 kg of 5A Molecular sieve |
| Cycle time | 10 minutes |

-continued

| | |
|---|---|
| Purge time | 11 seconds |
| $CO_2$ removal rate | 14.0 lbs/day |

I claim:

1. A process for the removal of carbon dioxide from a wet stream which process comprises passing the gas stream through an integrated absorption bed which comprises a first portion which is an absorbent for water whereby water is removed from the gas stream, a second portion which is an absorbent for carbon dioxide whereby carbon dioxide is removed from the gas stream and a third portion which is an absorbent for water which is saturated with water whereby water is reintroduced into the gas stream, the first portion of the integrated absorption bed being maintained at a higher pressure than that of the desorbing third portion of the bed by incorporating a pressure plate between the second portion and third portion of the integrated absorption bed.

2. A process according to claim 1 wherein the absorbent for water is selected from the group consisting of silica gel, 3A molecular sieve material and activated alumina.

3. A process according to claim 1 wherein the absorbent for carbon dioxide is selected from the group consisting of 5A, 10A or 13X molecular sieve material, activated carbon and activated charcoal.

4. A process according to claim 1 wherein the first and third portions of the integrated absorption bed contain the same absorption material for water.

5. A process according to claim 1 wherein the absorbing first bed is maintained at a pressure of about 5 psig higher than that of the desorbing third bed.

6. A process according to claim 1 wherein the gas stream which is treated is from an enclosed atmosphere.

7. A process as claimed in claim 6 wherein the gas stream which is treated is air from an apple store the said air being returned to the said store after treatment.

8. A process according to claim 1 which is operated continuously.

9. A process as claimed in claim 8 which comprises employing a second integrated absorption bed which is switched into contact with the gas stream when the first integrated absorption bed is spent, the first integrated absorption bed then being regenerated and the gas stream then being switched into contact with the regenerated first absorption bed when the second integrated absorption bed is spent.

* * * * *